(12) United States Patent
Licht (10) Patent No.: US 11,512,398 B2
(45) Date of Patent: Nov. 29, 2022

(54) MAGNETIC CARBON NANOMATERIALS AND METHODS OF MAKING SAME

(71) Applicant: C2CNT LLC, Venice, FL (US)

(72) Inventor: Stuart Licht, Venice, FL (US)

(73) Assignee: C2CNT LLC, Venice, FL (US)

( * ) Notice: Subject to any disclaimer, the term of this patent is extended or adjusted under 35 U.S.C. 154(b) by 0 days.

(21) Appl. No.: 17/314,698

(22) Filed: May 7, 2021

(65) Prior Publication Data
US 2021/0348282 A1    Nov. 11, 2021

Related U.S. Application Data

(60) Provisional application No. 63/022,284, filed on May 8, 2020.

(51) Int. Cl.
*C25B 1/135*    (2021.01)
*C01B 32/168*   (2017.01)
(Continued)

(52) U.S. Cl.
CPC ............ *C25B 1/135* (2021.01); *C01B 32/168* (2017.08); *C25B 1/50* (2021.01); *C25B 9/60* (2021.01); *C25B 11/061* (2021.01); *C25B 15/02* (2013.01); *B82Y 25/00* (2013.01); *B82Y 35/00* (2013.01); *B82Y 40/00* (2013.01);
(Continued)

(58) Field of Classification Search
CPC .. C25B 1/135; C25B 1/50; C25B 9/60; C25B 11/061; C25B 15/02; C25B 9/17; C25B 11/046; C01B 32/168; C01B 2202/06; C01B 2202/20; C01B 32/16; C01B 32/18; C01B 32/184; C01B 32/15; B82Y 25/00; B82Y 35/00; B82Y 40/00; C01P 2006/42; D01F 11/12
See application file for complete search history.

(56) References Cited

U.S. PATENT DOCUMENTS

2019/0271088 A1    9/2019    Licht
2020/0032404 A1    1/2020    Licht

OTHER PUBLICATIONS

Ren et al. "Transformation of greenhouse gas CO2 by molten electrolysis into a wide controlled selection of carbon nanotubes", 2017J. Ren et al. / Journal of CO2 Utilization 18, p. 335-344 (Year: 2017).*

(Continued)

*Primary Examiner* — Steven J Bos
*Assistant Examiner* — Syed T Iqbal
(74) *Attorney, Agent, or Firm* — Chamberlain, Hrdlicka, White, Williams & Aughtry (57) ABSTRACT

The embodiments of the present disclosure relate to a method, system and composition producing a magnetic carbon nanomaterial product that may comprise carbon nanotubes (CNTs) at least some of which are magnetic CNTs (mCNTs). The method and apparatus employ carbon dioxide ($CO_2$) as a reactant in an electrolysis reaction in order to make mCNTs. In some embodiments of the present disclosure, a magnetic additive component is included as a reactant in the method and as a portion of one or more components in the system or composition to facilitate a magnetic material addition process, a carbide nucleation process or both during the electrosynthesis reaction for making magnetic carbon nanomaterials.

25 Claims, 9 Drawing Sheets

(51) Int. Cl.
*C25B 11/061* (2021.01)
*C25B 9/60* (2021.01)
*C25B 1/50* (2021.01)
*C25B 15/02* (2021.01)
*B82Y 25/00* (2011.01)
*B82Y 35/00* (2011.01)
*B82Y 40/00* (2011.01)

(52) U.S. Cl.
CPC ...... *C01B 2202/06* (2013.01); *C01B 2202/20* (2013.01); *C01P 2006/42* (2013.01)

(56) References Cited

OTHER PUBLICATIONS

Yoshida et al. "Atomic-Scale In-situ Observation of Carbon Nanotube Growth from Solid State Iron Carbide Nanoparticles", 2008, Nano Lett., vol. 8, No. 7, p. 2082-2086 (Year: 2008).*
Douglas Anna et al., Iran catalyzed growth of crystalline multi-walled carbon nanotubes from ambient carbon dioxide mediated by molten carbonates, Carbon, vol. 116, Feb. 12, 2017, pp. 572-578.
International Search Report issued in corresponding PCT application No. PCT/US2021/031371 dated Oct. 25, 2021 (7 pages).
Written Opinion of the International Searching Authority issued in corresponding PCT application No. PCT/JS2021/031371 dated Oct. 25, 2021 (13 pages).

* cited by examiner

FIG. 9A FIG. 9B FIG. 9C
FIG. 9D FIG. 9E FIG. 9F

MAGNETIC CARBON NANOMATERIALS AND METHODS OF MAKING SAME

CROSS-REFERENCE TO RELATED APPLICATIONS

This application claims priority to and the benefit of U.S. Provisional Patent Application Ser. No. 63/022,284 filed on May 8, 2020, which is hereby incorporated by reference in its entirety.

TECHNICAL FIELD

This disclosure generally relates to production of carbon nanomaterials. In particular, the disclosure relates to a method, system and composition for producing magnetic carbon nanomaterials.

BACKGROUND

Multi-walled carbon nanotubes (CNTs) consist of concentric walls of cylindrical graphene sheets. Graphene is a two-dimensional, honeycomb-structured material formed by a single layer of $sp^2$ hybrid orbital carbon atoms with a thickness of about 0.335 nm, which corresponds to the thickness of one carbon atom. CNTs have the highest measured tensile strength (strength 93,900 MPa) of any material. CNTs have many useful properties including high electrical-conductivity, high thermal-conductivity, flexibility, and they can also be chemically modified. The implication of these useful properties is that CNTs have a steady rise in their applications.

A known process by which CNTs are produced is chemical vapor deposition, CVD. CVD of CNTs is expensive and it has a high carbon-footprint.

SUMMARY

The embodiments of the present disclosure relate to a method, system and composition for producing an electrosynthesis carbon-nanomaterial (CNM) product that comprises various nanostructures, including carbon nanotubes (CNTs), at least some of which are magnetic CNTs (mCNTs) or other magnetic carbon nanostructures or morphologies. The method and apparatus may employ carbon dioxide ($CO_2$) as a source of carbon, where the carbon is a reactant in an electrolysis reaction in order to make a magnetic CNM (mCNM) product that may include mCNTs. The electrolysis reaction effects a mass transfer of carbon from the source of carbon to the mCNM. In some embodiments of the present disclosure, iron is included as a reactant in the method and as a portion of one or more components in the apparatus to facilitate a magnetic material addition process or a carbide nucleation process or both during the electrolysis reaction for making a mCNM product comprising mCNTs that contain iron or iron carbide. In other embodiments of the present disclosure, nickel or nickel carbide is included as a reactant in the method and as a portion of one or more components in the apparatus to facilitate a magnetic material addition process or a carbide nucleation process or both during the electrolysis reaction for making a mCNM product comprising mCNTs that contain nickel or nickel carbide.

Some embodiments of the present disclosure relate to a method for making a mCNM product. The method comprises the steps of: heating an electrolyte media to obtain a molten electrolyte media. Next, the molten electrolyte media is disposed between an anode and a cathode of an electrolytic cell. The method further includes a step of disposing a magnetic additive component within the electrolytic cell. The method also includes a step of applying an electrical current to the cathode and the anode within the electrolytic cell and a step of collecting a mCNM product from the cathode.

Some embodiments of the present disclosure relate to methods for selecting the properties of one or more specific structures/morphologies of the mCNM product. The mCNM product can be influenced by a magnetic field in terms of their position and/or their orientation. Without being bound by any particular theory, mCNM products can be used in: one or more medical applications, such as drug delivery and imaging; for precise positioning; consumer electronics; information storage; wastewater treatment; electrochemical sensors; and/or as a catalyst in various chemical reactions.

As used herein, the term "selecting a nanomaterial morphology" refers to any step that contributes to controlling the structure and/or morphology of the electrosynthesis mCNM product. In some embodiments of the present disclosure, the selected morphology of the mCNM may include the following CNM morphologies: carbon nanotubes, carbon nanofibers, carbon nano-onions, carbon nano-scaffolds, carbon nano-spheres, carbon-nano-helices, carbon nano-platelets, graphene or combinations thereof. In some embodiments of the present disclosure, the step of selecting a nanomaterial morphology can result in an electrosynthesis mCNM product that is partially, mostly, substantially all or all of a single CNM morphology. For example, the step of selecting a nanomaterial morphology may include adding a nanomaterial selection component, in terms of electrical current and/or a chemical component, for producing an electrosynthesis mCNM product that is partially, mostly, substantially all or all of one of: mCNTs, magnetic carbon nanofibers, magnetic carbon nano-onions, magnetic carbon nano-scaffolds, magnetic carbon nano-spheres, magnetic carbon-nano-helices, magnetic carbon nano-platelets or magnetic graphene.

In some embodiments of the present disclosure, the step of selecting a nanomaterial morphology comprises applying the electrical current to the cathode and anode as a direct current (DC). For example, a DC electrolysis current may select for a mCNM product that comprises a CNT morphology.

In some embodiments of the present disclosure, the step of selecting a nanomaterial morphology comprises applying the electrical current to the cathode and anode as an alternating current (AC). For example, an AC electrolysis current may select for a CNM product with a nano-onion morphology.

In another embodiment, the step of selecting the nanomaterial morphology comprises adding ZnO to the molten electrolyte media and applying an AC electrolysis current, which may select for a CNM product with a graphene platelet morphology.

In another embodiment, the step of selecting the nanomaterial morphology comprises adding iron oxide to the electrolyte media and selecting a high-density electrical current for a carbon-nano-helices product.

In another embodiment, the step of selecting the nanomaterial morphology comprises adding MgO to the molten electrolyte media and selecting an electrical current for a hollow carbon nano-sphere product.

Some embodiments of the present disclosure relate to a system that comprises an electrolytic cell for making one or more magnetic carbon nanomaterial products. The electrolytic cell comprises one or more walls that define a plenum and an anode and a cathode that are positioned within the plenum. The plenum is configured to receive and hold a molten electrolyte media between the anode and the cathode. The electrolytic cell is further configured to receive a magnetic material addition component or a carbide-growth component, an optional nanomaterial selection component and an electrical current that is applicable to the anode and the cathode in order to initiate an electrolysis reaction for making the one or more magnetic carbon nanomaterial products.

Without being bound by any particular theory, embodiments of the present disclosure relate to an electrolysis reaction that splits carbon dioxide ($CO_2$) in a molten electrolyte media to make a mCNM product, including carbon-nanotubes (mCNT), by a magnetic material addition process or a carbide nucleation process or both. Magnetic carbon nanomaterials, including mCNTs, have a variety of applications, such as in medical therapies to direct a therapy to a localized region of the subject. Magnetic carbon nanomaterials, including mCNTs, may also be used as recoverable catalysts.

Other embodiments of the present disclosure relate to an electrosynthesis process for making a mCNM product in the absence of $CO_2$. Without being bound by any particular theory, some embodiments of the present disclosure relate to an electrolysis reaction that splits carbonate in a molten electrolyte media to provide a source of carbon to make the mCNM product, including carbon-nanotubes (mCNT), by a magnetic material addition process or a carbide nucleation process or both.

Some embodiments of the present disclosure relate to the use of a vessel that is made of a material that comprises iron and/or nickel to receive and hold a molten electrolyte media. Additionally or alternatively, iron and/or nickel from the anode can migrate to the cathode upon which carbon nanotubes grow. For example, energy dispersive X-ray spectroscopy (EDS) elemental analysis confirms the presence of iron in the carbon nanotubes, and X-ray diffraction (XRD) analysis confirms the presence of iron carbide. Excess iron within the electrolyte media can be accomplished using a vessel that comprises iron, using an iron-rich alloy for the anode, such as Incoloy, using an iron-containing alloy for the cathode and providing a further source of iron through an iron-based additive that may be introduced into the electrolyte media, the electrolyte media itself or combinations thereof. Rather than a nucleation facilitator the excess iron may result in a magnetic material addition, that is a graphene layer, also referred to as graphitic carbon, coated iron-carbide nodules on the exterior surface of the structures within the mCNT product, such as mCNTs, as well as iron carbide within the structures of the mCNM, such as mCNTs.

Some embodiments of the present disclosure relate to a composition that is an electrolyte media for making a magnetic carbon nanomaterial product. The electrolyte media comprising a carbonate; and a magnetic material addition component or a carbide-growth component or both.

Without being bound by any particular theories, by using $CO_2$ from the atmosphere, or $CO_2$ from anthropogenic sources, as the carbon source to provide carbon as a reactant in the electrolysis reactions of the present disclosure, embodiments of the present disclosure can decrease the greenhouse gas footprint of processes and systems that make a mCNM product that may comprise mCNTs and/or other magnetic nano-structures.

BRIEF DESCRIPTION OF THE DRAWINGS

These and other features of the present disclosure will become more apparent in the following detailed description in which reference is made to the appended drawings.

FIG. 1 shows two photographs and a line drawing, wherein

FIG. 2 shows three images of carbon nanomaterial product, according to embodiments of the present disclosure, and one line graph, wherein

FIG. 3 shows SEM images of carbon nanomaterial product, according to embodiments of the present disclosure, wherein

FIG. 4 shows the results of X-ray diffraction (XRD) analysis of a carbon nanomaterial product, made according to embodiments of the present disclosure, wherein

FIG. 5 shows energy dispersive X-Ray spectroscopy (EDS) of three spots of a carbon nanomaterial product, made according to embodiments of the present disclosure when the electrolyte media used in the method of manufacture was molten for about one day prior to initiating the electrolysis step, wherein

FIG. 8 shows images of mCNT formed according to embodiments of the present disclosure, wherein

FIG. 9 shows images of products of CNT formation in a cast iron vessel with a brass cathode and a Nichrome anode, wherein FIG. 9A (i) shows the vessel, FIG. 9A (ii) shows a side-elevation view of the cathode with the CNT product thereupon and the anode; FIG. 9A(iii) shows a front elevation view of the cathode with the CNT product thereupon.

DETAILED DESCRIPTION

The embodiments of the present disclosure relate to a method, system and compositions for producing a magnetic carbon nanomaterial (mCNM) product that comprises carbon nanostructures, at least some of which are magnetic. At least one example of a magnetic carbon nanostructure are magnetic carbon nanotubes (mCNTs). As used here, the terms "magnetic carbon nanomaterial", "magnetic carbon nanostructures", "magnetic carbon nanotubes" and "mCNTs" refer, generally or specifically as the context permits, to carbon nanomaterials that comprise iron, iron carbide, nickel, nickel carbide or other magnetic materials to such an extent that the carbon nanomaterials are able to be moved by a magnetic field, as defined herein below. The method and apparatus employ carbon dioxide ($CO_2$) as a reactant in an electrolysis reaction in order to make the mCNM product. In some embodiments of the present disclosure, iron, nickel or other magnetic materials are included as a reactant in the method and as a portion of one or more components in the system to facilitate a magnetic material addition process or a carbide nucleation process or both during the electrolysis reaction for making the mCNM product.

Some embodiments of the present disclosure relate to methods that employ an electrolysis reaction for making the mCNM product. The electrolysis reaction occurs in an environment with a molten electrolyte media that is positioned between an anode and a cathode. Carbon is introduced into the molten electrolyte media, as either pure $CO_2$, anthropogenic $CO_2$ such as that from a smokestack or combustion exhaust, concentrated $CO_2$ or $CO_2$ that is entrained in atmospheric air. Furthermore, iron is present in the environment. The iron may originate from the materials that make up one or more walls in an electrolytic cell in which the electrolysis reaction occurs, from the anode, from the cathode, from an additive that is added to the electrolyte media or combinations thereof. When an electric current with a substantially constant current density is applied to the anode and cathode, the $CO_2$ is split to generate carbon, which combines with the iron to form the mCNM product. As will be appreciated by those skilled in the art, other magnetic materials, such as nickel, can also be combined with the generated carbon to make the mCNM product.

In contrast with known chemical vapor deposition (CVD) methods for making CNTs, the physical chemical environment of the embodiments of the present disclosure is an electrochemical process, while CVD is chemical. The embodiments of the present disclosure utilize $CO_2$ as a reactant, while CVD utilizes organic reactants. The embodiments of the present disclosure employ chemical reactions that build the mCNM product at the interface between the molten electrolyte media and the solid cathode, while CVD generally occurs at a gas/solid interface.

There are also further subtle differences between the embodiments of the present disclosure and CVD methods. The embodiments of the present disclosure provide a higher density of reactive carbon (the molten electrolyte media) near the growth interface upon the cathode. While CVD may or may not apply an electric field to the substrate during CVD methods, the embodiments of the present disclosure always apply an intense electric field that is rapidly decreasing through the double layer adjacent to the cathode during growth of the mCNM product. CVD has been associated with the transition metal nucleation of carbon to grow CNTs. It had not been contemplated previously that the ability of carbides to dissolve carbon and thereby nucleate growth of CNTs or mCNTs applies to the electrochemical environment of the embodiments of the present disclosure.

Carbon nanomaterials containing iron carbide or other ferromagnetic magnetic materials, referred to herein as magnetic carbon nanomaterials, are attracted to magnets and have been of growing interest for a wide range of fields including medicine and catalysis. Known magnetic materials include, but are not limited to, iron, nickel, cobalt, gadolinium, samarium, neodymium, and alloys containing one or more of his magnetic materials, such as steel, and materials with significant, but smaller ferromagnetic, paramagnetic or diamagnetic properties. Each of these magnetic materials may be referred to herein as a "magnetic additive component" and are contemplated within the embodiments of the present disclosure as are any other materials that can contribute to the formation of the mCNM through a electrosynthesis method. There are many uses for the mCNM product in medical applications, such as being used as a tool for targeted drug delivery and imaging, in imaging such as magnetic resonance imaging (MRI), stem cells, and anti-cancer agents for the treatment of colon cancers, lymphatic cancers, melanoma and bladder cancers.

For catalyst applications, the field of magnetic and therefore recoverable nano-scaled and dendritic materials has been studied and is of growing interest. Specific applications include mCNTs, magnetic graphene, and magnetic carbon sphere and nano-onion catalysts.

Unless defined otherwise, all technical and scientific terms used herein have the same meaning as commonly understood by one of ordinary skill in the art to which this disclosure belongs.

As used herein, the term "about" refers to an approximately +/−10% variation from a given value. It is to be understood that such a variation is always included in any given value provided herein, whether or not it is specifically referred to.

As used herein, the term "magnetic" refers to the property of a material that can be influenced by a magnetic field or it may generate a magnetic field. When a material is influenced by a magnetic field it may change its orientation to align with the magnetic field lines of the magnetic field and/or it may move in response to the presence of the magnetic field.

As used herein, the term "magnetic additive component" refers to a chemical component that can participate in the electrosynthesis methods of the present disclosure in order to make the mCNM product. The magnetic additive component may be a magnetic material addition component or a carbide-growth component or a combination thereof that can be used in the methods, systems and as part of the compositions of the present disclosure, so that a magnetic material and/or a carbide is incorporated or formed on top of, within or both of a carbon nano-scaled structure that is a constituent of the mCNM product. The term "magnetic material addition component" may be used herein to refer to a chemical component that comprises magnetic material and that may participate in making the mCNM product by a magnetic material addition process. The term "carbide-growth component" may be used herein to refer to a carbide chemical component that may participate in making the mCNM product by a carbide nucleation process. In general, the magnetic additive component is incorporated into the mCNM product so that one or more constituent nanostructures within the mCNM product are moveable when placed within or near a magnetic field.

Embodiments of the present disclosure will now be described by reference to the Examples and the figures.

Some embodiments of the present disclosure relate to a method for producing a mCNM product that may comprise mCNTs. The method comprises the steps of heating an electrolyte media to obtain a molten electrolyte media; positioning the molten electrolyte media between an anode and a cathode of an electrolytic cell; positioning a magnetic additive component, such as material addition component or a carbide-growth component within the electrolytic cell; applying an electrical current to the cathode and the anode in the electrolytic cell; and collecting the mCNM product from the cathode. Optionally, the method further comprises a step of selecting for the mCNM product to comprise a greater proportion of a desired nano-scaled morphology, which may also referred to herein as a desired nanostructure.

The step of heating the electrolyte media can be achieved by various means, as would be appreciated by the skilled reader. For example, a heating apparatus such as an oven or furnace can be used to heat the electrolyte media to a sufficient temperature so that it transitions into a molten liquid state. As such, any heating apparatus that can achieve the temperatures required to heat the electrolyte media to its melting point are contemplated herein.

In some embodiments of the present disclosure, the electrolyte media comprises one or more carbonates. In some embodiments of the present disclosure, the electrolyte media comprise lithiated carbonate electrolytes including pure $Li_2CO_3$ (with a melting point of about 723° C.), or $Li_2CO_3$ mixed with other carbonates such as $Na_2CO_3$, $K_2CO_3$, $MgCO_3$, $CaCO_3$, $BaCO_3$, or $Li_2CO_3$ mixes with other salts including oxides, borates, sulfates, phosphates or nitrates.

The molten electrolyte media is positioned between an anode and cathode of an electrolytic cell. The electrolytic cell may be any type of vessel that can maintain its structural integrity in the face of the electrochemical environment that occurs during the electrolysis reactions of the present disclosure. The electrolytic cell will have one or more walls that may be made of a desired material or that are coated with a desired material.

The magnetic additive component refers to a chemical component that can be a constituent of the electrolyte medium, or otherwise added to the electrolyte medium before or during the electrosynthesis methods disclosed herein. In some embodiments of the present disclosure, the magnetic additive component may be a magnetic material addition component or a carbide-growth component any combination thereof. The magnetic additive component may originates from one or more walls of the electrolysis cell. In some embodiments of the present disclosure, the magnetic additive component originates from the anode. In some embodiments of the present disclosure, the magnetic additive component originates from the cathode. In some embodiments of the present disclosure, the magnetic additive component originates from an iron-based additive that is added to the electrolyte media. In some embodiments of the present disclosure, the magnetic additive component originates from the electrolyte media. In some embodiments of the present disclosure, the magnetic additive component originates from any combination of the one or more walls of the electrolysis cell, the anode, the cathode, an iron-based additive that is added to the electrolyte media or the electrolyte media.

The magnetic additive component may be added to the electrolyte media in a suitable quantity. For example, in some embodiments of the present disclosure, the magnetic additive component is added to the electrolyte media in an amount of about 0.001 molal to about 10 molal or higher. In some embodiments of the present disclosure, the magnetic additive component is added to the electrolyte media in an amount of about 0.003 molal to about 3 molal, in an amount of about 0.01 molal to about 1 molal, or 0.03 molal to about 0.3 molal. As used herein, the term "molal" refers to one mole of the magnetic additive component per one kilogram of the electrolyte medium. In other embodiments of the present disclosure, the magnetic additive component is added in an amount of about 0.03 to 0.06 molal, 0.07 to 0.10 molal, 0.03 to 0.05 molal, 0.03 to 0.05 molal, 0.10 to 0.13 molal, 0.14 to 0.17 molal, 0.18 to 0.21 molal, 0.22 to 0.25 molal, 0.26 to 0.30 molal. In one preferred embodiment of present disclosure, the magnetic additive component is added in an amount of about 0.1 molal.

In some embodiments of the present disclosure, the electrolyte media may be melted inside the electrolytic cell or it may be melted outside the cell and transferred thereto. Because the electrolysis reaction can occur over a time period whereby the molten electrolyte media could cool, the electrolytic cell can be configured with its own integral heating apparatus or it may be configured to be heated by an external heating apparatus that is external to the electrolytic cell so that the electrolyte media is maintained in the molten state for the desired period of time. In addition and without being bound by any particular theory, without a heating apparatus, heat is added both through the exothermic reaction of $CO_2$ and through the resistive heat generated by the electrolysis overpotential.

In some embodiments of the present disclosure, the electrolytic cell maybe configured to maintain the electrolyte media at least at about 375° C., at least at about 400° C., at least at about 500° C., at least at about 600° C., at about 650° C., at least at about 675° C., at least at about 700° C., at least at about 725° C., at least at about 750° C., at least at about 775° C., at least at about 800° C., at least at about 825° C., at least at about 850° C., at least at about 875° C., at least at about 900° C., or at least at about 1000° C.

The anode can be made of various metals or alloys. Some anodes can be made of materials that comprise nickel, chromium, iron or combinations thereof. Some non-limiting examples of suitable materials for the anodes of the present disclosure include: substantially pure nickel, an alloy that is comprised of substantially mostly nickel, an alloy that is comprised of some nickel, substantially pure chromium, an alloy that is comprised of substantially mostly chromium, an alloy that is comprised of some chromium, substantially pure iron, an alloy that is comprised of substantially mostly iron, an alloy that is comprised of some iron, or combinations thereof. For example, Inconel 718 or other Inconels, such as, but not limited to Inconel 600 and Inconel 625, Nichrome A (composed of about 80% nickel and about 20% chromium), Nichrome C (composed of about nickel, iron and chromium), Incoloy alloy (such as Incoloy 800 composed of about 40% iron, about 30-35% nickel and about 19-23% chromium) or combinations thereof may be suitable for use as an anode in the embodiments of the present disclosure. The anode may be planar in shape, or other shapes conductive to molten electrolysis, and can be made of various dimensions in order to fit within the electrolytic cell.

In some embodiments of the present disclosure, the magnetic additive component may originate from the anode, the magnetic additive component can comprise an amount of about 0.001 wt % to about 100 wt % of the total material of the anode. In some embodiments of the present disclosure, the magnetic material can comprise an amount of about 0.01 wt % to about 99 wt % of the total material of the anode, in an amount of about 0.1 wt % to about 90 wt %, or 1 wt % to about 90 wt, or about 10 wt % to about 50 wt %.

In other embodiments of the present disclosure, the magnetic additive component is added in an amount of about 0.01 to 19 wt %, 10 to 20 wt %, 10 to 20 wt %, 30 to 40 wt %, 40 to 50 wt %, 50 to 60 wt %, 60 to 70 wt %, 70 to 80 wt %, 90 to 100 wt %. In one preferred embodiment of present disclosure, the wt % is 30% to about 50 wt %. In other embodiments of the present disclosure, the magnetic additive component in the anode is added in an alloy containing two or more magnetic materials, such as an amount of about 80 wt % of one magnetic metal and 20% of another magnetic metal.

The cathode anode can be made of various metals or alloys. Some cathodes can be made of materials that comprise copper, zinc, iron or combinations thereof. Some non-limiting examples of suitable materials for the cathodes of the present disclosure include: substantially pure copper, an alloy that is comprised of substantially mostly copper, an alloy that is comprised of some copper, substantially pure zinc, an alloy that is comprised of substantially mostly zinc, an alloy that is comprised of some zinc, substantially pure iron, an alloy that is comprised of substantially mostly iron, an alloy that is comprised of some chromium, substantially pure iron, an alloy that is comprised of substantially mostly iron, an alloy that is comprised of some iron, or combinations thereof. For example, brass such as Muntz brass may be suitable for use as an cathode in the embodiments of the present disclosure. The cathode may be planar in shape, or other shapes conducive to molten electrolysis, and can be made of various dimensions in order to fit within the electrolytic cell.

The magnetic additive component may originate from the cathode, the magnetic additive component can comprise an amount of about 0.001 wt % to about 100 wt % of the total material of the cathode. In some embodiments of the present disclosure, the magnetic additive component can comprise an amount of about 0.01 wt % to about 99 wt % of the total material of the cathode, in an amount of about 0.1 wt % to about 90 wt %, or 1 wt % to about 90 wt %, or about 10 wt % to about 50 wt %. In other embodiments of the present disclosure, the magnetic additive component is added to the cathode materials in an amount of about 0.01 to 19 wt %, 10 to 20 wt %, 30 to 40 wt %, 40 to 50 wt %, 50 to 60 wt %, 60 to 70 wt %, 70 to 80 wt %, 90 to 100 wt %. In one preferred embodiment of present disclosure, the magnetic additive component is added to the cathode between is 30% to about 50 wt % of the total cathode materials. In other embodiments of the present disclosure, the magnetic additive component in the cathode is added in an alloy containing two or more magnetic additive components, for example an amount of about 80 wt % of one magnetic additive component and 20% of another magnetic additive component based on the total amount of the magnetic additive component within the total cathode materials or based on the total cathode materials. The step of positioning a magnetic additive component within the electrolytic cell includes adding a magnetic additive component, including metal salts and/or a carbide to the electrolytic cell so that when the electrolysis reaction occurs the magnetic additive component facilitates growth of the mCNM product. In some embodiments of the present disclosure, the carbide may participate in one or more nucleation reactions that result in the growth of CNTs and mCNTs within the mCNM product. In some embodiments of the present disclosure, the carbide may be magnetic.

In some embodiments of the present disclosure, the magnetic additive component may originate as a metal, a metal salt, including but not limited to metal carbides or a non-metal carbide or any combination thereof.

Suitable examples of a metal carbide include, but are not limited to: an iron carbide, a nickel carbide, a cobalt carbide, a zirconium carbide, a chromium carbide, a tantalum carbide, a hafnium carbide or any combination thereof.

Suitable examples of a non-metal carbide include, but are not limited to: a silicon carbide, a germanium carbide or any combination thereof.

In some embodiments of the present disclosure, the current is applied at a substantial constant current density. For example, the current density of the applied current may be between about 0.001 A/cm$^2$ and about 10 A/cm$^2$. In some embodiments the current density of the applied current may be between about 0.003 A/cm$^2$ and about 3 A/cm$^2$; between about 0.01 A/cm$^2$ and about 1 A/cm$^2$; between about 0.03 A/cm$^2$ and about 0.6 A/cm$^2$; or between about 0.06 A/cm$^2$ and about 0.3 A/cm$^2$. In some embodiments of the present disclosure, the current density is about 0.1 A/cm$^2$.

A 750° C. molten Li$_2$CO$_3$ electrolyte contains an equilibrium concentration of lithium oxide of 0.2 molal in accordance with Equation 1 (EQN. 1):

$$Li_2CO_3(molten) \rightleftharpoons Li_2O(dissolved) + CO_2(gas) \quad (EQN.\ 1).$$

In the process of CO$_2$ molten carbonate electrolysis, small transition metal "seeds" were observed at the ends of the CNT product, and it was shown that the mechanism of molten carbonate CNT growth may be activated by both tip and root transition metal nucleation processes.

The reduction of $CO_2$ in lithiated carbonate electrolytes is a 4 e-process that, without being bound to any particular theory, proceeds in accordance with Equation 2 (EQN. 2):

$$Li_2CO_{3(molten)} \rightarrow C_{(nanomaterial)} + O_{2(gas)} + Li_2O_{(dissolved)} \quad (EQN.\ 2)$$

$CO_2$ added to the molten electrolyte media chemically reacts with lithium oxide to renew and reform $Li_2CO_3$, without being bound to any particular theory, in accordance with Equation 3 (EQN. 3):

$$CO_{2(atmospheric\ or\ stack)} + Li_2O_{(dissolved)} \rightleftharpoons Li_2CO_{3(molten)} \quad (EQN.\ 3)$$

When EQN. 2 is combined with EQN. 3 this yields the net electrolysis reaction, without being bound to any particular theory, in accordance with the 4 e-transfer reaction Equation 4 (EQN. 4):

$$CO_{2(gas)} \rightarrow C_{(nanomaterial)} + O_{2(gas)} \quad (EQN.\ 4)$$

Lithium carbonate melts at about 723° C. At temperatures higher than 800° C., without being bound to any particular theory, a two, rather four, electron reduction increasingly dominates, and by 950° C., the electrolysis product is pure carbon monoxide, rather than carbon, without being bound to any particular theory, in accordance with the 2 e-transfer reaction Equation 5 (EQN. 5):

$$CO_{2(gas)} + 2e^- \rightarrow CO_{2(gas)} + \tfrac{1}{2}O_{2(gas)} \quad (EQN.\ 5)$$

EXAMPLES

Example 1

In order to perform the methods of the present disclosure, electrolyte media were made using lithium carbonate ($Li_2CO_3$, about 99.5% pure) and lithium oxide ($Li_2O$, about 99.5% pure). Using a heating element, the electrolyte media was heated until molten to provide a molten electrolyte. The molten electrolyte media was then positioned within an electrolytic cell that included one or more walls for defining a plenum therebetween. As discussed further below, the walls of the electrolytic cell were composed of (or coated in) stainless steel, such as stainless steel 304, or cast iron. Within the electrolytic cell, an anode and a cathode were positioned. The anode was made up of Inconel 718. The anode can be selected to generate oxygen during the electrolysis operations. The cathode was made up of Muntz brass, which is an alloy of about 59-61% copper and about 39-41% zinc and some trace iron.

When the molten electrolyte media was positioned within the electrolytic cell and between the anode and cathode an electric current is applied to the anode and the cathode to initiate the electrolysis reaction. In this example, the electric current was about 0.5 amps (A) and it was applied at a constant current density.

During the electrolysis reaction, a carbon nanomaterial product was collected on the cathode. When the electrolysis reaction was stopped, by removing the current, the cathode was removed from the electrolytic cell and allowed to cool. The carbon nanomaterial product can then be collected from the cooled cathode by gentle tapping. The carbon nanomaterial product was then washed with either deionized water DI water or up to 6 molar hydrochloric acid. It was observed that both types of washing yielded a similar carbon nanomaterial product, but the acid wash accelerated the washing. The washed carbon nanomaterial product was then separated from the washing solution by either paper filtration or centrifugation. It was observed that both separation approaches yielded similar carbon nanomaterial product, but use of a centrifuge accelerated the separation step.

Figure 1A:
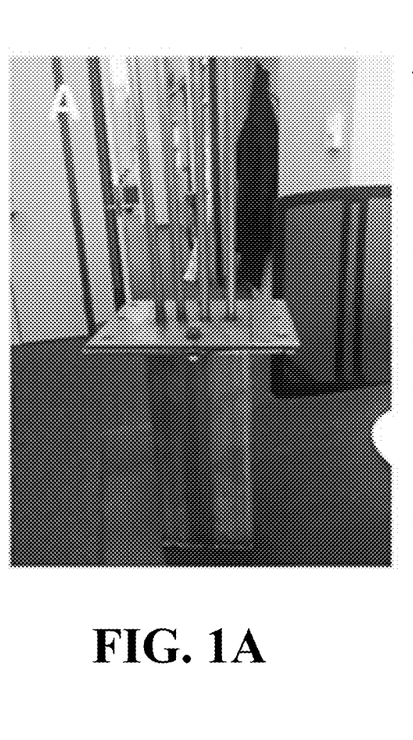
FIG. 1A is a photograph of an electrolysis unit according to embodiments of the present disclosure.
Figure 1B:
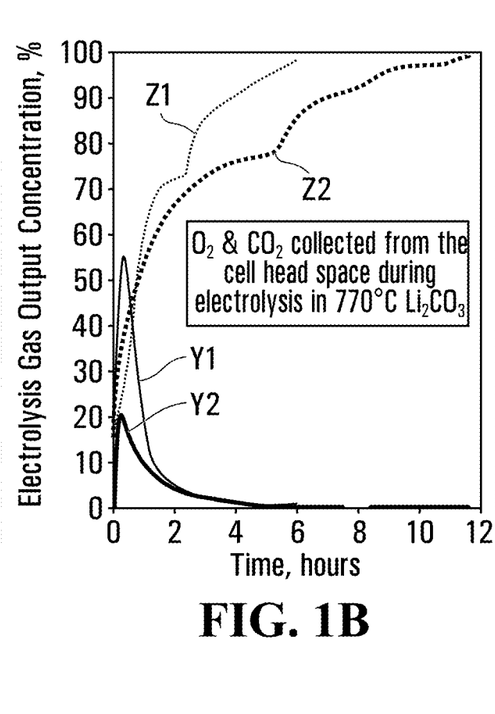
FIG. 1B is a line graph that shows electrolytic gas output concentration (%) over time (hours) collected from a head space of a electrolysis cell during an electrolysis reaction in $Li_2CO_3$ at about 770° C., wherein line Y1 shows carbon dioxide concentration without $Li_2O$, line Z1 is oxygen without $Li_2O$, line Y2 shows carbon dioxide with 1 m $Li_2O$, and line Z2 shows oxygen with 1 m $Li_2O$; and, FIG. 10 is a photo of a carbon nanomaterial product, according to embodiments of the present disclosure, that is attracted to a magnet.
Figure 1C:
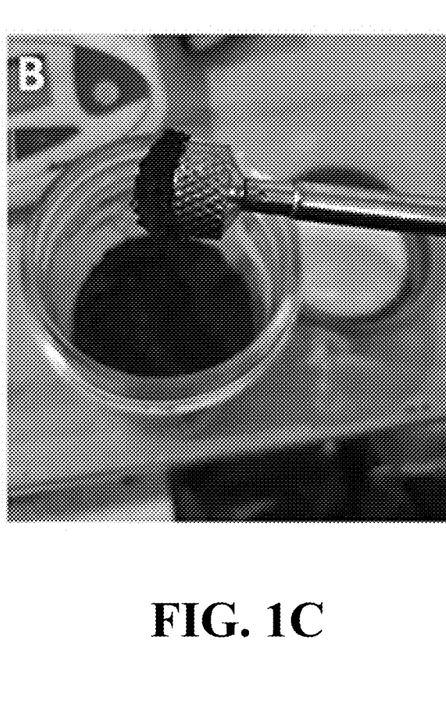

FIG. 1A shows a photograph of an example of a stainless steel 304 electrolysis cell that was used to produce carbon nanomaterial products according to embodiments of the present disclosure. Pure $CO_2$ gas bubbled into a molten lithium carbonate electrolyte with and without lithium oxide (1 mole $Li_2O$ per kg $Li_2CO_3$). As seen in FIG. 1B, after a brief period of activation, the gas phase portion of the electrolysis reaction product rises to about 100% oxygen and no $CO_2$ escaped the electrolysis reaction. The electrolysis is conducted in a stainless steel 304 electrolysis cell of FIG. 1A. Within the electrolysis cell, the anode was made of Inconel 718 and the cathode was made of Muntz brass. During the electrolysis reaction, in accordance with EQN. 4 above, a carbon nanomaterial product grows on the cathode, and after cooling, and washing, the carbon nanomaterial is found to be carbon nanotubes. The extracted cathode is cooled and the solid product was readily peeled off the cathode and washed to remove any excess electrolyte media. Unexpectedly, when the electrolysis reaction was conducted in an electrolytic cell that had at least some iron in the walls of the cell, the carbon nanomaterial product was found to be magnetic. As shown in FIG. 10, the magnetic CNTs strongly attracted to a magnet.

Example 2

This example used many of the same steps as Example 1, with one exception being the introduction of airborne $CO_2$ (about 216 ppm $CO_2$ in ambient air), rather than pure $CO_2$ or concentrated $CO_2$ from air, was bubbled into the molten electrolyte media. In this example, the electrolyte media used was a $Li_2CO_3$ molten electrolyte media that was exposed to hot air for about 24 hours prior to initiating the electrolysis reaction by applying an electric current similar to the other examples described herein. The anode was a plate of about 5 cm$^2$ of Inconel 718 and the cathode was made of Muntz brass. The carbon nanomaterials produced in this example were also magnetic.

In order to characterize the structural morphology of the carbon nanomaterial product, the product was imaged using a scanning electron microscopy (SEM) and a transmission electron microscope (TEM). X-ray diffraction (XRD) was used to characterize the atomic structure of the carbon nanomaterial product.

The carbon nanomaterial product was collected from the cathode, washed and separated, and analyzed by PHENOM Pro Pro-X scanning electron microscope (SEM) with EDS, FEI Teneo LV SEM, and by FEI Teneo Talos F200X transmission electron microscope (TEM). XRD powder diffraction data were collected on a Rigaku Miniflex diffractometer and analyzed with the Jade software package.

The basic morphology of the carbon nanomaterial product was essentially the same, whether they were produced in a ceramic (alumina) electrolysis cell or a steel electrolysis cell. The observed exception will be shown in a later example, when excess iron is introduced from the anode during the electrolysis reaction.

Figure 2A:
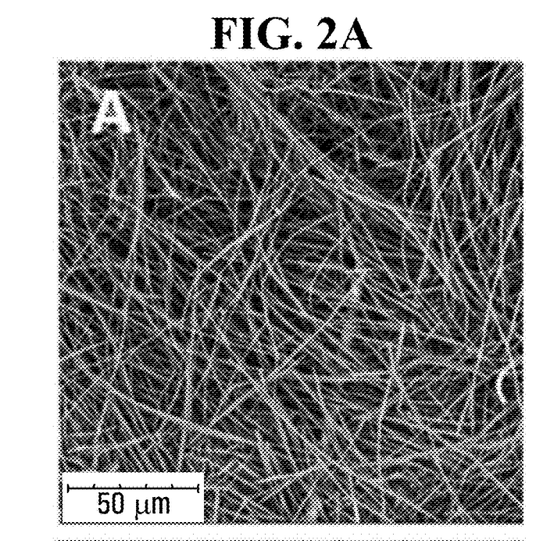
FIG. 2A is a scanning electron microscope (SEM) image of the carbon nanomaterial product (scale bar is 50 µm)
Figure 2B:
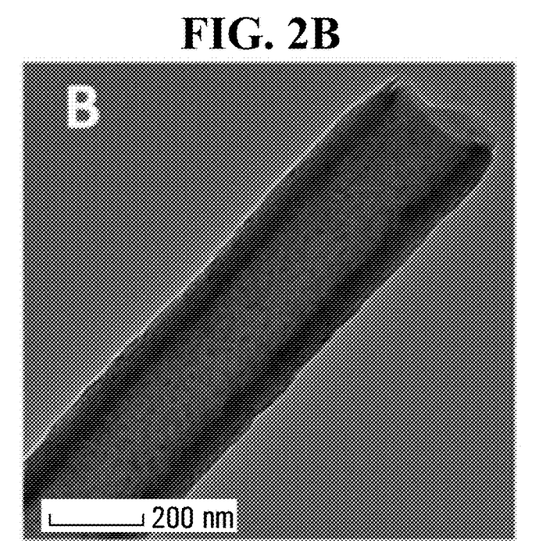
FIG. 2B is a transmission electron microscope (TEM) image of the carbon nanomaterial product (scale bar is 200 nm)
Figure 2C:
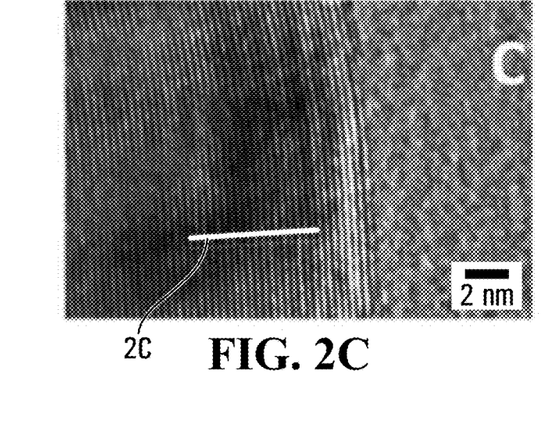
FIG. 2C is another TEM image of the carbon nanomaterial product at higher magnification than the image of FIG. 2C (scale bar is 2 nm)

FIG. 2A is an SEM image that reveals a highly uniform carbon nanomaterial product, in this case carbon nanotubes (CNTs) using $CO_2$ from the air as the reactant. In FIG. 2A the scale bar is 2 nm. FIG. 2B and FIG. 2C are TEM images that show the CNT walls, and that the graphene spacing between the CNT walls is the expected 0.33 to 0.34 nm (see the distance between each of the ten peaks between the two red bars and below the double sided arrow in FIG. 2D). In FIG. 2B the scale bar is 200 nm and in FIG. 2C the scale bar is 2 nm.

Example 3

Further magnetic CNTs were made as part of a carbon nanomaterial product made according to embodiments of the present disclosure. In this example, magnetic CNTs were made when the anode contained no iron.

The electrolysis reaction was conducted using an electrolysis cell with one or more walls that were lined with nickel, or a nickel alloy, to decrease the presence of iron within the electrolysis cell. The electrolyte media was molten $Li_2CO_3$ that contained about 0.67 m $Li_2O$ (about 2% on a weight basis compared to the weight of the whole electrolyte media) and it was maintained at a temperature of about 770° C. The electrolytic cell was open to air containing $CO_2$. The anode was made of Nichrome A and the cathode was made of Muntz brass. The electrolysis reaction occurred by applying a current of 25 A at a substantially constant current density of about 0.1 $A/cm^2$.

After about four hours of the electrolysis reaction, the cathode was removed from the electrolysis cell and cooled. The solid carbon nanomaterial product was peeled off the cathode and washed to remove excess electrolyte media prior to microscopy.

The carbon nanomaterial product was found to be about 98% uniform CNTs as determined by visual inspection of multiple SEMs and the TEM. The coulombic efficiency approaches 100% during this electrolysis reaction. The coulombic efficiency of electrolysis is calculated as the percent of applied, constant current charge that was converted to carbon determined by the following Equation 6 (EQN. 6):

$$100\% \times C_{experimental}/C_{theoretical} \qquad (EQN. 6).$$

This is measured by the mass of washed carbon product removed from the cathode ($C_{experimental}$) and calculated from the theoretical mass, $C_{theoretical} = (Q/nF) \times (12.01 \text{ g C mol}^{-1})$ which is determined from Q, the time integrated charged passed during the electrolysis, F, the Faraday (96485 As $mol^{-1}$ $e^-$), and the n=4 $e$-$mol^{-1}$ reduction of tetravalent carbon.

Figure 3A:
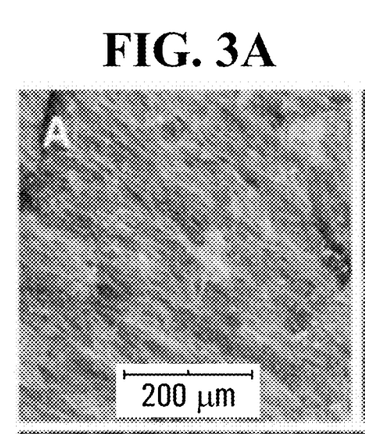
FIG. 3A is an SEM image at a first magnification (scale bar is 200 µm)
Figure 3B:
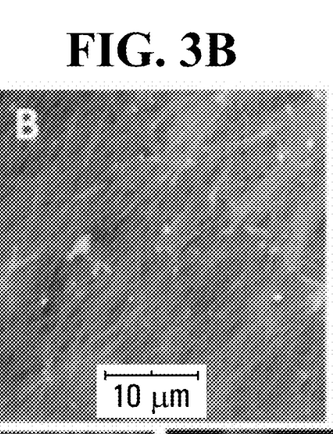
FIG. 3B is an SEM image at a second, higher magnification (scale bar is 10 µm)
Figure 3C:
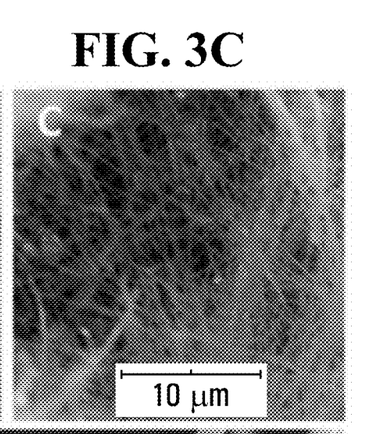
FIG. 3C is another SEM image at the third magnification (scale bar is 10 µm)
Figure 3D:
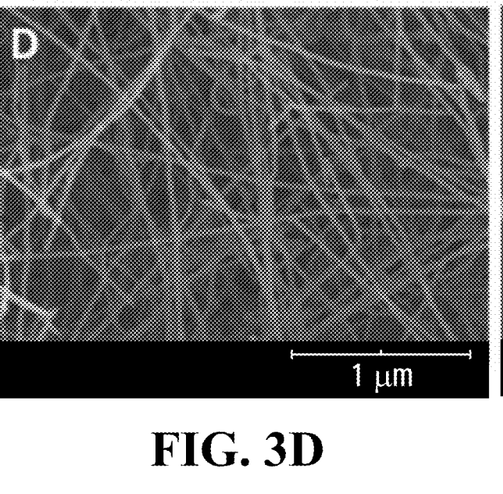
FIG. 3D is a high-resolution SEM image at a first magnification (scale bar is 3 µm); and, FIG. 3E is a high-resolution SEM image at a second, higher magnification (scale bar is 1 µm).
Figure 3E:
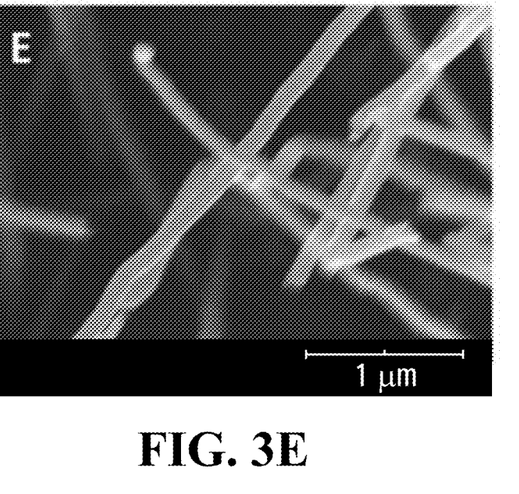

FIG. 3A, FIG. 3B and FIG. 3C are each SEM images of the carbon nanomaterial product of Example 3. FIG. 3A has a scale bar of 200 µm, FIG. 3B has a scale bar of 10 µm and FIG. 3C has a scale bar of 10 µm. FIG. 3D and FIG. 3E are high resolution SEM images with scale bars of 3 µm and 1 µm, respectively.

Example 4

Further magnetic CNTs were made as part of a mCNM product made according to embodiments of the present disclosure. In this example, magnetic CNTs were made with two samples of electrolyte media. The first electrolyte media for sample A was molten for about one day prior to initiating the electrolysis step; the second electrolyte media used in the electrolysis for sample A was freshly melted.

The electrolysis reaction was conducted using an electrolysis cell with one or more walls that comprised stainless steel 304. The electrolyte media was molten $Li_2CO_3$ that contained about 0.67 m $Li_2O$ (about 2% on a weight basis compared to the weight of the whole electrolyte media) and it was maintained at a temperature of about 770° C. The electrolytic cell was open to air containing $CO_2$. The anode was made of Nichrome A and the cathode was made of Muntz brass. The electrolysis reaction occurred by applying an electric current at a substantially constant current of density of 25 A at a substantially constant current density of about 0.1 $A/cm^2$.

After about four hours of the electrolysis reaction, the cathode was removed from the electrolysis cell and cooled. The solid carbon nanomaterial product was peeled off the cathode and washed to remove excess electrolyte media prior to microscopy.

Figure 4A:
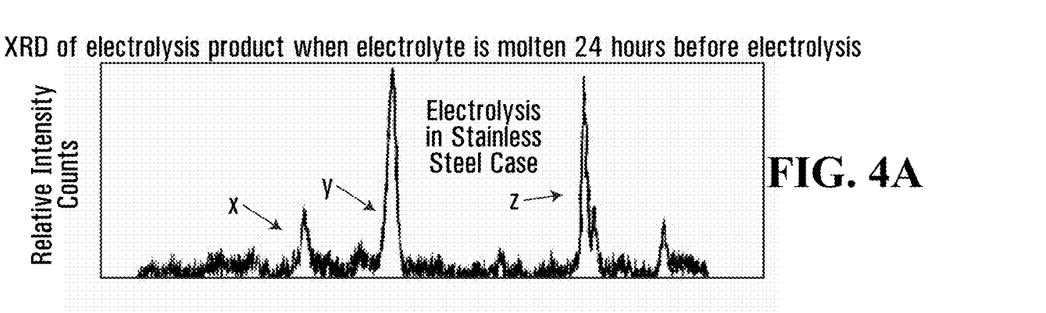
FIG. 4A shows XRD analysis when the electrolyte media used in the method of manufacture was molten for about one day prior to initiating the electrolysis step.
Figure 4B:
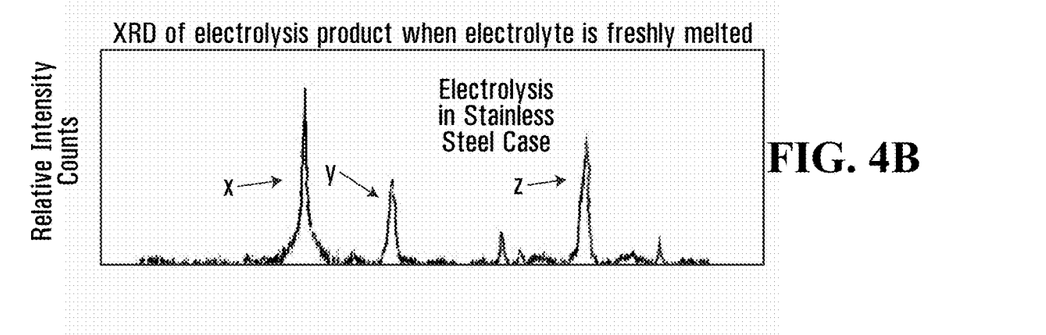
FIG. 4B shows XRD analysis when the electrolyte media used in the method of manufacture was freshly melted; and, FIG. 4C shows a library XRD of compounds relevant to the carbon nanomaterial product.
Figure 4C:
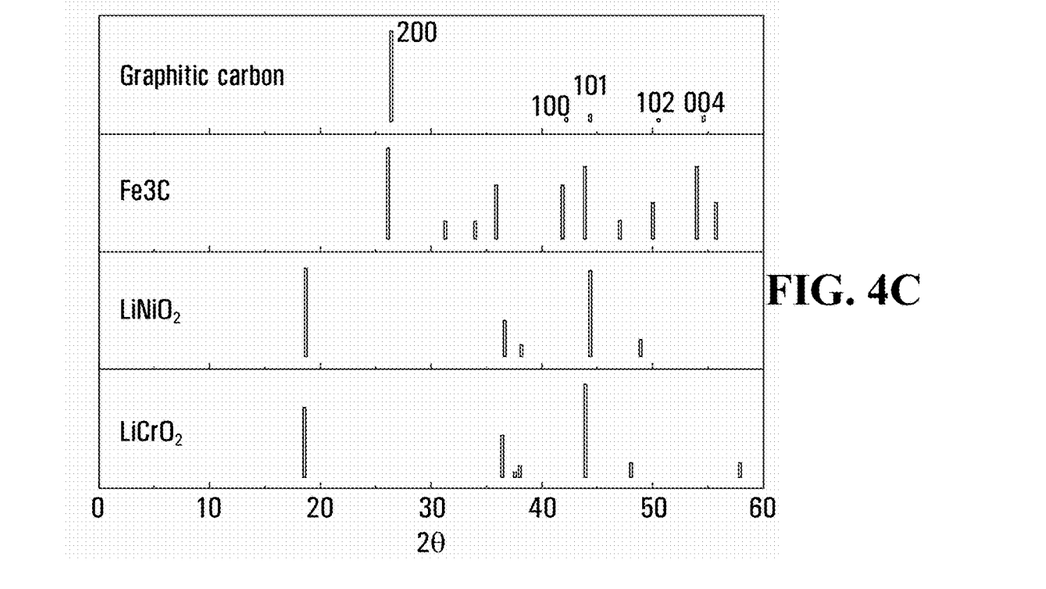

FIG. 4A shows the results of x-ray diffraction (XRD) of Sample A. FIG. 4B shows the XRD results for Sample B. FIG. 4C shows a library XRD of compounds relevant to the product (graphitic carbon, iron carbide, and nickel or chromium lithium oxides. XRD results of Sample A exhibits evidence of significantly more iron carbide in the graphitic carbon product than the XRD results of Sample B. There is no clear sign of corrosion after either electrolysis reaction, it is evident that the long electrolyte media soak prior to Sample A resulted in greater iron carbide in the product. Significant peaks are observed at 2Ø of x=19°, y=26°, and z=~44°. Specifically, as compared to the XRD library, both Sample A and Sample B exhibited either chromium or nickel oxide peaks at x and z (see FIG. 4A and FIG. 4B), and both samples exhibited graphitic peaks at y. However, the ratio of the peaks in Sample A, that is the relative height of peak z to either peak x or y compared to Sample B, shows a strong contribution of the iron carbide spectra at y and z. Furthermore, there is a doublet peak at about 44°, and in Sample A the dominance of the left peak compared to either the right peak or peak x, is consistent with the contribution of the iron carbide. EDS of sample A is consistent with the XRD results of Sample A, showing an elemental analysis at three spots on the carbon nanomaterial product a point that is 100.0% atomic percent C, a point that is 94.9% C and 5.1% Fe, and a point that is 92.4% C, 5.8% Fe and 1.9% Cr. While the source of the iron to form the carbide is evidently from the one or more walls of the electrolysis cell, it is evident that alternate sources can be from oxidation of a component of the anode (for iron containing anodes), as a direct additive to the electrolyte media, or from a component of the cathode (for iron containing cathodes), or any combinations thereof.

Figure 5A:
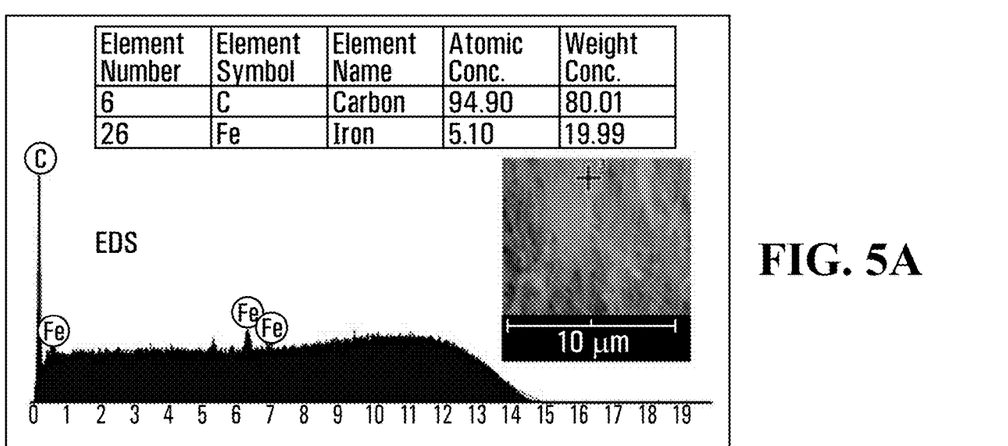
FIG. 5A shows data obtained at a first position within the product.
Figure 5B:
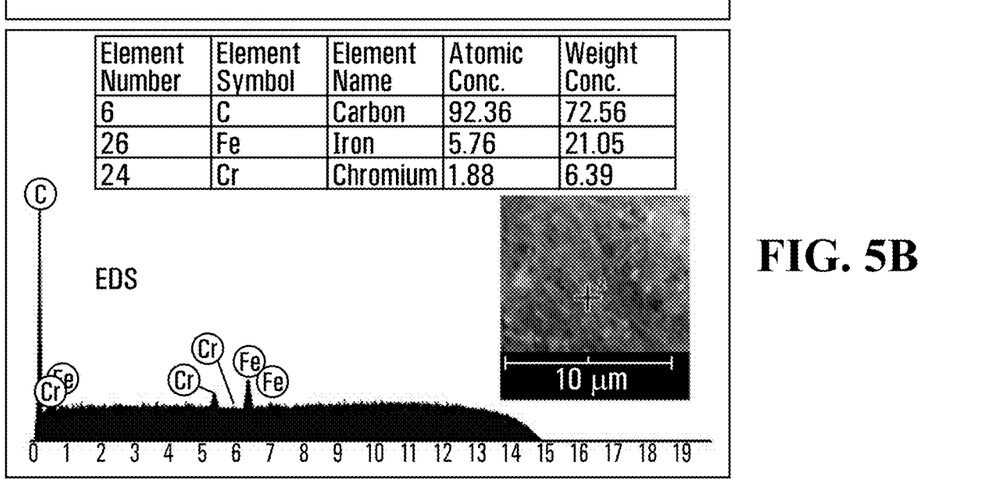
FIG. 5B shows data obtained at a second position within the product; and, FIG. 5C shows data obtained at a third position within the product.
Figure 5C:
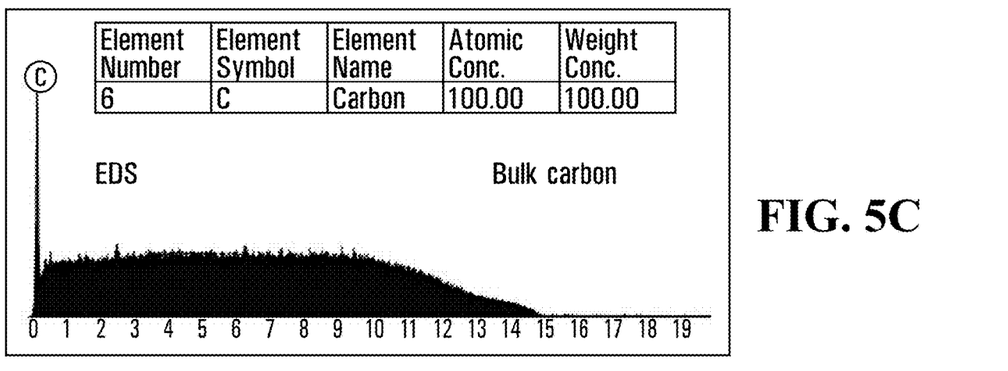

FIG. 5 shows EDS data of Sample A, that is consistent with the XRD results of Sample A. The EDS data shows an elemental analysis at three positions on the carbon nanomaterial product: FIG. 5A shows a first point (see $+^3$ in insert image of FIG. 5A, scale bar is 10 µm) that comprises 94.9% carbon and 5.1% iron, FIG. 5B shows a second position (see +2 position in insert image of FIG. 5B, scale bar is 10 µm) that comprises 92.4% carbon, 5.8% iron and 1.9% Cr; and, FIG. 5C shows the EDS data obtained at a third position that is 100.0% atomic percent carbon.

Without being bound by any particular theory, the source of the iron to form the carbide is most likely from the one or more walls of the electrolysis cell. However, alternate sources of iron can be from oxidation of a component of the anode (for iron containing anodes), as a direct iron-based additive that may be added to the electrolyte media such as cast iron powder, iron metal, steel, stainless steel, or other iron containing metal alloys, or iron oxide including, but not limited to FeO, $Fe_2O_3$, $Fe_3O_4$, or any other iron containing salts, or otherwise, or from a component of the cathode (for iron containing cathodes), or any combinations thereof.

Figure 6:
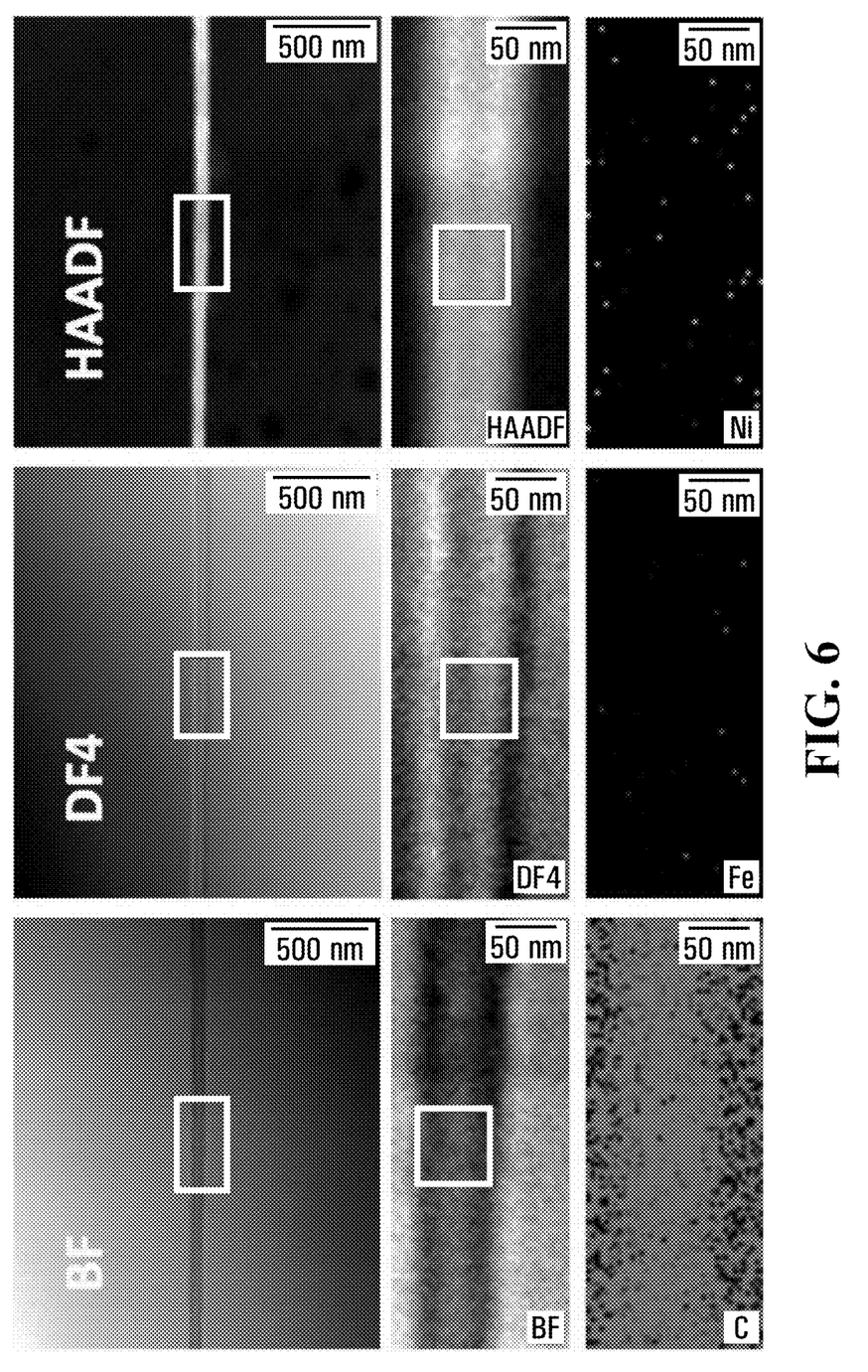
FIG. 6 shows EDS elemental analysis data, including: an upper row showing bright field (BF), dark-field (DF) and high angle angular dark field (HAADF) images from high resolution TEM of a first region (within rectangle added to images) of a carbon nanomaterial product, made according to embodiments of the present disclosure, taken at a first magnification (scale bar is 500 nm); a middle row showing BF, DF and HAADF images take from TEM of the first region of a carbon nanomaterial product, made according to embodiments of the present disclosure, taken at a second, higher magnification (scale bar is 50 nm); and a lower row showing the presence/absence of carbon (left-hand image), iron (middle image) and nickel (right-hand image).
Figure 7:
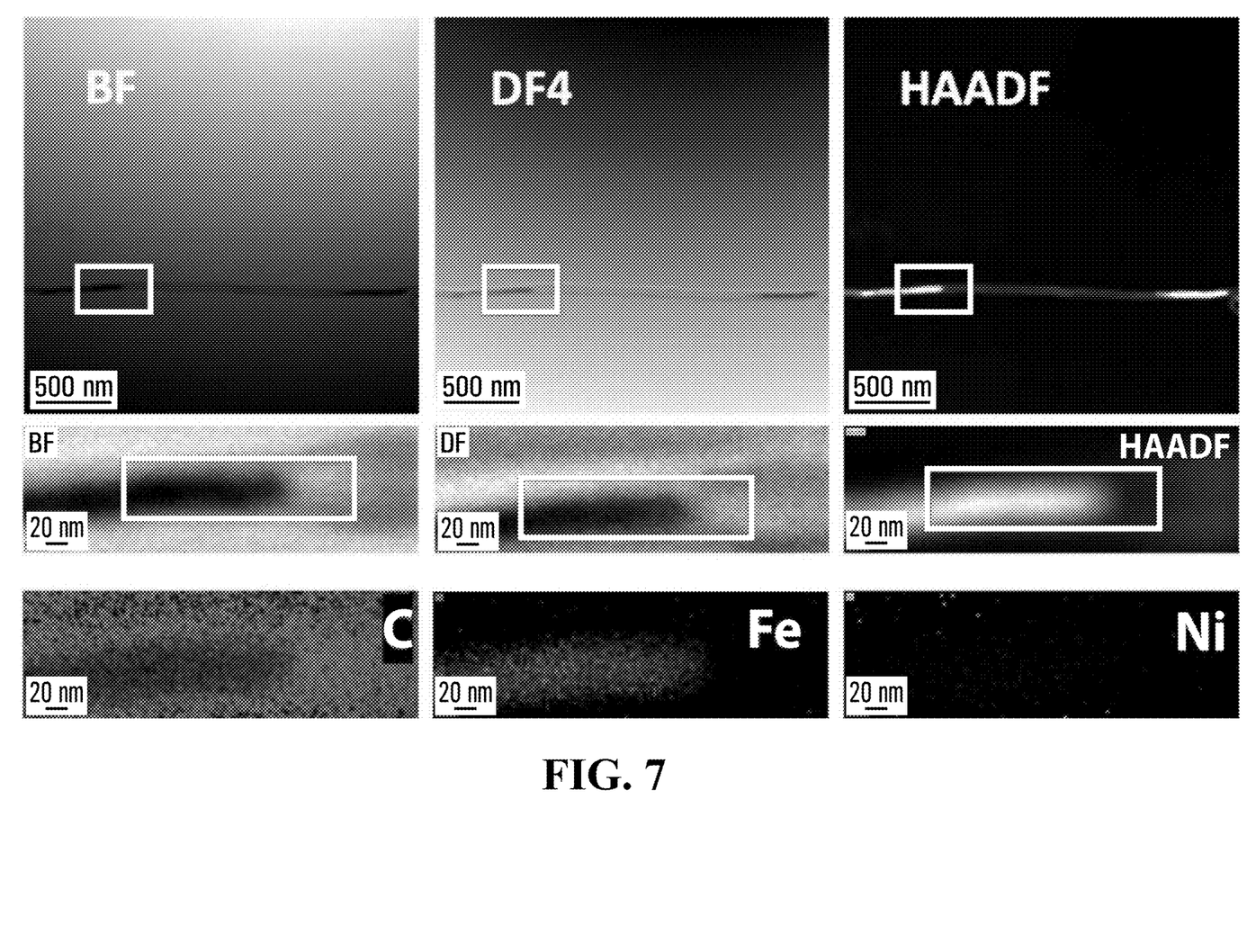
FIG. 7 shows EDS elemental analysis data, including: an upper row showing bright field (BF), dark-field (DF) and high angle angular dark field (HAADF) images from high resolution TEM of a second region (within rectangle added to images) of a carbon nanomaterial product, made according to embodiments of the present disclosure, taken at a first magnification (scale bar is 500 nm); a middle row showing BF, DF and HAADF images take from TEM of the first region of a carbon nanomaterial product, made according to embodiments of the present disclosure, taken at a second, higher magnification (scale bar is 50 nm); and a lower row showing the presence/absence of carbon (left-hand image), iron (middle image) and nickel (right-hand image).

FIG. 6 and FIG. 7 are EDS (including bright field (BF), dark-field (DF) and high angle angular dark field (HAADF) images from high resolution TEM of two different regions of the synthesized mCNM product. The first region (shown in FIG. 6) is at the hollow core of the carbon nanotube and the CNT product has carbon composition walls and no metal in the core. The second region (shown in FIG. 7) is the metal core of the carbon nanotube, and mainly iron and a small amount of nickel is evident.

Example 5

Further magnetic CNTs were made as part of a carbon nanomaterial product made according to embodiments of the present disclosure. In this example, magnetic CNTs were made in an excess of iron.

The electrolysis reaction was conducted using an electrolysis cell with one or more walls that comprised stainless steel 304. The electrolyte media was molten $Li_2CO_3$. The electrolytic cell was open to air containing $CO_2$. The anode was made of an Incoloy alloy (composed of about 40% iron, about 30-35% nickel and about 19-23% chromium) and the cathode was made of Muntz brass. The electrolysis reaction occurred by applying an electric current of 8 A at a substantially constant current density of about 0.1 A/cm$^2$.

After about four hours of the electrolysis reaction, the cathode was removed from the electrolysis cell and cooled. The solid carbon nanomaterial product was peeled off the cathode and washed to remove excess electrolyte media prior to microscopy.

It was noted that with the high content of iron, the anode may have continuously released iron oxide during the electrolysis reaction, and because this electrolysis reaction occurred in pure $Li_2CO_3$ at 0.1 A/cm$^2$, the measured coulombic efficiency was observed to drop to about 89%.

Figure 2D:
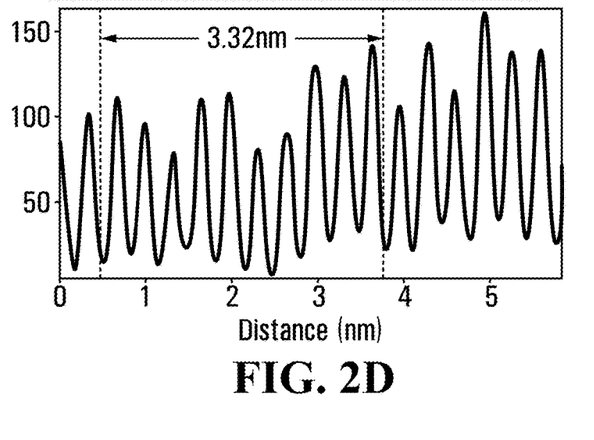
FIG. 2D is a line graph that represents the spacing between the walls of ten carbon nanotubes within the carbon nanomaterial product, taken along the line 2C in FIG. 2C.
Figure 8A:
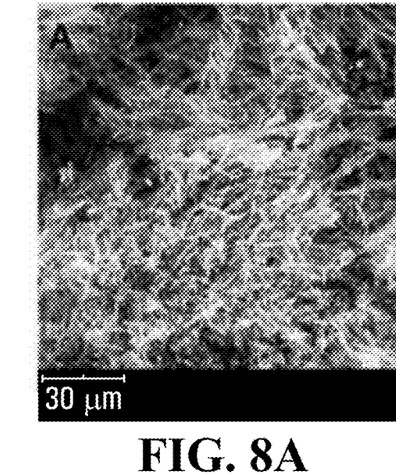
FIG. 8A, FIG. 8B and FIG. 8C show SEM images of the CNT product formed by carbon dioxide ($CO_2$) splitting in a molten electrolyte media at different magnification levels.
Figure 8B:
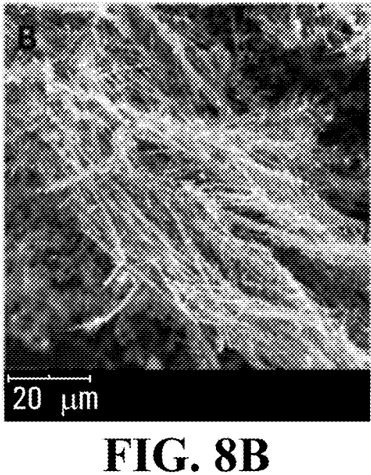
Figure 8C:
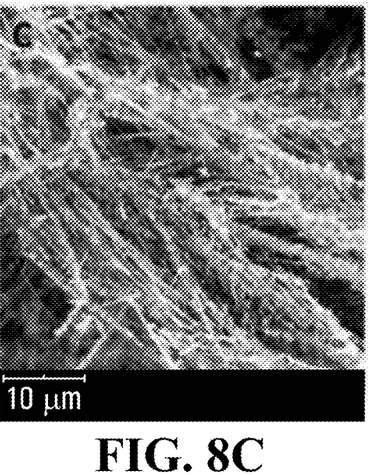
Figure 8D:
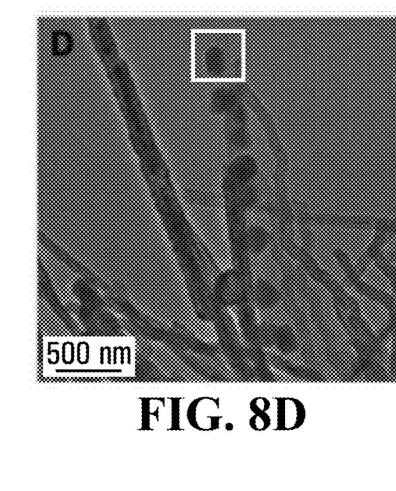
FIG. 8D, FIG. 8E and FIG. 8F show TEM images of the CNT product formed by $CO_2$ splitting in a molten electrolyte media at different magnification levels.
Figure 8E:
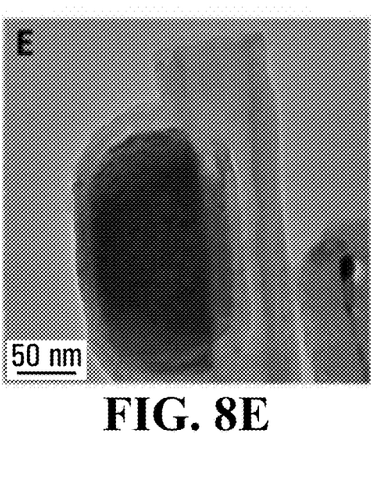
Figure 8F:
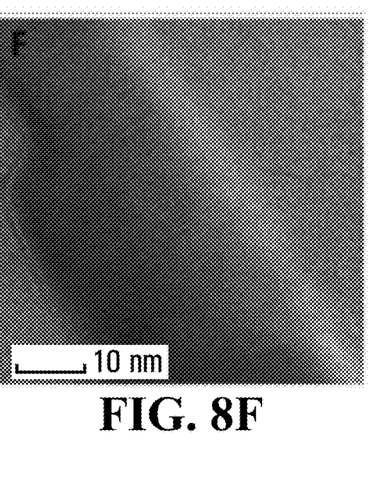

FIG. 8A, FIG. 8B and FIG. 8C show SEM images of the carbon nanomaterial product from this Example 5. The scale bars in these images are 30 µm, 20 µm, and 10 µm, respectively. FIG. 8D, FIG. 8E and FIG. 8F show TEM images of the carbon nanomaterial product from this Example 5. The scale bars in these images are 500 nm, 50 nm, and 10 nm, respectively. The carbon nanomaterial product comprised at least some magnetic CNTs, as shown in FIG. 8. Unlike the CNTs shown in FIG. 2 and FIG. 3, the CNTs shown in FIG. 8 comprise graphene coated nodules that are seen on the outside of the CNTs and the interiors of the CNTs are partially filled with a deposit. Similar, nodules and filling have been observed in iron carbide driven CNT growth using chemical vapor deposition (CVD). In these CVD formed CNTs the interior of the nodules and the CNT filling has previously been identified as iron carbide. As shown in the TEM image of FIG. 8F, the inter-lattice distance between the layers is only 0.20 nm, which is significantly smaller than the graphene inter-lattice layer of 0.33 to 0.34 nm between the CNT graphene walls, as shown in FIG. 2D. The 0.20 nm inter-lattice separation evident in the carbon nanomaterial product of Example 6 appears similar to previously identified separations in carbon nanostructures and in those previous structures, the inter-lattice separation was identified as iron carbide.

Example 6

Based upon the previously described examples, it was observed that an electrolysis reaction conducted in a $Li_2CO_3$ molten electrolyte media with a low concentration of added $Li_2O$, or an electrolyte-media aged for 24 hours can lead to a higher yield of uniform CNTs within the carbon nanomaterial product, than an equivalent pure $Li_2CO_3$ electrolyte media that has not been aged. This lead to the concept that an electrolysis reaction conducted with pure molten $Li_2CO_3$ electrolyte media that has not been aged, but is conducted in a cast iron vessel, rather than stainless steel vessel, may promote iron carbide formation of graphitic structures and lead to a more uniform carbon nanomaterial product of an electrolysis reaction.

Figure 9A:
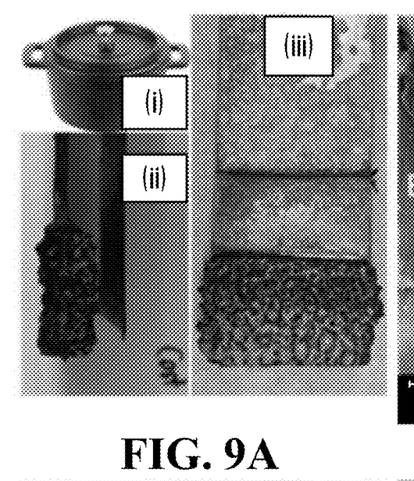

The electrolysis reaction of Example 6 was conducted using an electrolysis cell that was a cast iron vessel that was about a 10 cm diameter and about 5 cm height (iron that contains 2 to 4.3% carbon, see FIG. 9A(i)). The electrolyte media was $Li_2CO_3$ that was heated inside the cast iron vessel overnight to remove the surface layer of the vessel. Then about 300 g of fresh $Li_2CO_3$ was added into the vessel and heated to about 770° C. act as the molten electrolyte media. The electrolytic cell was open to air containing $CO_2$. The anode was made of Nichrome and the cathode was made of Muntz brass. The electrolysis reaction occurred by applying an electric current of 2 A at a substantially constant current density of about 0.1 A/cm$^2$.

After about four hours of the electrolysis reaction, the cathode was removed from the electrolysis cell and cooled (see FIG. 9A (ii) and (iii)). The solid carbon nanomaterial product was peeled off the cathode and washed to remove excess electrolyte media prior to microscopy.

Figure 9B:
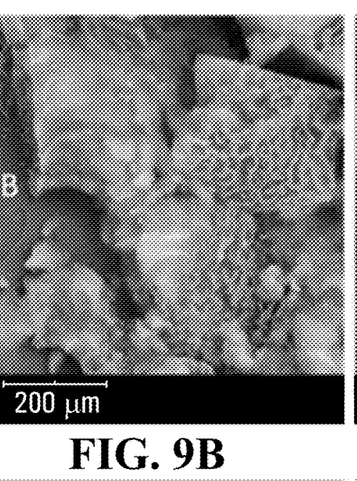
FIG. 9B shows an SEM image of the CNT product after being dissociated from the cathode at a first magnification.
Figure 9C:
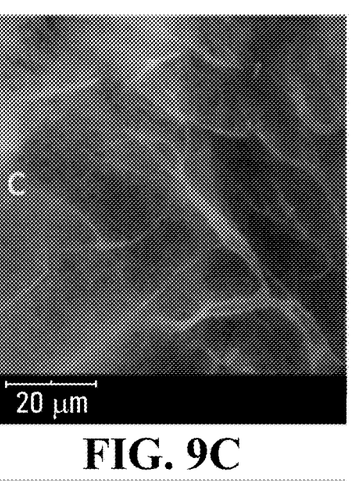
FIG. 9C shows the CNT product of FIG. 9B at a second, greater magnification.
Figure 9D:
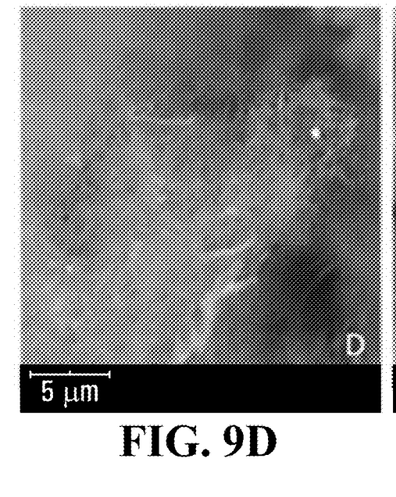
FIG. 9D shows the CNT product of FIG. 9C at a third, greater magnification.
Figure 9E:
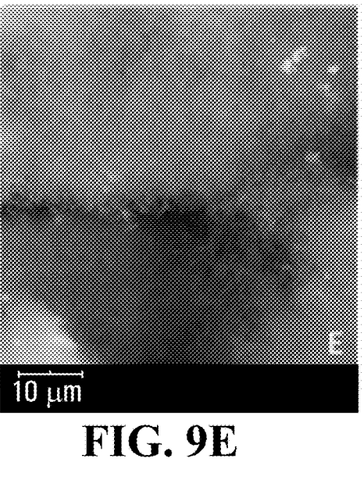
FIG. 9E shows the CNT product of FIG. 9D at a fourth, greater magnification.
Figure 9F:
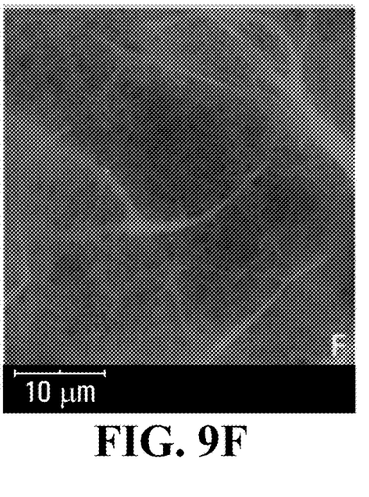
FIG. 9F shows the CNT product of FIG. 9E at a fifth, greater magnification.

FIG. 9B through FIG. 9F show SEM images of the carbon nanomaterial product of this Example 6. FIG. 9B has a scale bar of 200 µm, FIG. 9C has a scale bar of 20 µm, FIG. 9D has a scale bar of 5 µm, FIG. 9E and FIG. 9F each have a scale bar of 10 µm. The magnetic CNTs within the carbon nanomaterial product are highly uniform and have a high aspect (length to diameter) ratio. The coulombic efficiency, as measured by EQN. 6, approached 100% and the product was uniform (~98% pure) ultrathin, magnetic carbon-nanotubes.

Without being bound by any particular theory, the examples described herein provide ferromagnetic carbon nanotubes as a product of $CO_2$ bubbled through a molten electrolyte media during an electrolysis reaction or by exposure to air that contains $CO_2$ or other sources of $CO_2$. The mechanism of making the mCNTs appears to be via a magnetic material addition process or a carbide nucleation process, rather than a transition metal mediated process. It was also observed in Example 6 that use of a cast iron vessel as the electrolysis cell for $CO_2$ electrolysis with a molten lithium carbonate electrolyte media produces highly uniform mCNTs with a high aspect ratio in an efficient coulombic fashion.

I claim:

1. A method for producing a magnetic carbon nanomaterial product comprising:
   a) heating an electrolyte media to obtain a molten electrolyte media;
   b) positioning the molten electrolyte media between an anode and a cathode of an electrolytic cell;
   c) introducing a magnetic additive component within the electrolytic cell for performing carbide-driven growth of the magnetic carbon nanomaterial product;
   d) introducing a source of carbon within the electrolytic cell;
   e) applying an electrical current to the cathode and the anode in the electrolytic cell; and,
   f) collecting the magnetic carbon nanomaterial product from the cathode, wherein the magnetic carbon nanomaterial is moveable with a magnetic field.

2. The method of claim 1, wherein the magnetic additive component comprises at least one of a magnetic material addition component, a carbide-growth component and any combination thereof.

3. The method of claim 1, further comprising a step of selecting a nano-morphology of a constituent of the magnetic carbon nanomaterial product to comprise a magnetic carbon nanotube product, a magnetic carbon nanofiber product, a magnetic carbon platelet product, a magnetic graphene product, a magnetic carbon nano-onion product, a magnetic, a hollow carbon nano-sphere product and any combination thereof.

4. The method of claim 1, wherein the magnetic carbon nanomaterial product is attracted to a magnet.

5. The method of claim 2, wherein the carbide-growth component is a metal carbide.

6. The method of claim 5, wherein the metal carbide is one of an iron carbide, a nickel carbide, a cobalt carbide; a zirconium carbide, a chromium carbide, a tantalum carbide, a hafnium carbide and any combination thereof.

7. The method of claim 6, wherein the metal carbide is the iron carbide.

8. The method of claim 2, wherein the carbide-growth component is a non-metal carbide.

9. The method of claim 8, wherein the non-metal carbide is one of a silicon carbide, a germanium carbide and any combination thereof.

10. The method of claim 2, wherein the magnetic material additive component is one or more of iron, nickel, cobalt, gadolinium, samarium, neodymium, steel and alloys comprising one or more magnetic materials with ferromagnetic properties, paramagnetic properties, diamagnetic properties and any combination thereof.

11. The method of claim 1, wherein the electrolysis cell comprises one or more walls that are composed of steel, stainless steel, iron, cast iron, a coating that comprises nickel, a nickel alloy, iron, cast iron, an alloy that comprises iron and any combination thereof.

12. The method of claim 1, wherein the magnetic additive component is incorporated or formed as one or more nodules on the magnetic carbon nanomaterial product.

13. The method of claim 12, wherein the nodules are covered by one or more layers of graphitic carbon.

14. The method of claim 1, wherein the magnetic additive component originates from one or more walls of the electrolysis cell, from the anode, from the cathode, the electrolyte media and any combination thereof.

15. The method of claim 1, wherein the magnetic additive component originates from an iron-based additive that is added to the electrolyte media.

16. The method of claim 15, wherein the iron-based additive is one or more of cast iron powder, iron metal, steel, stainless steel, an iron containing metal alloy, an iron oxide, $FeO$, $Fe_2O_3$, $Fe_3O_4$, or an iron containing salt.

17. The method of claim 1, wherein the source of carbon is carbon dioxide, the electrolyte media, the molten electrolyte media and any combination thereof.

18. The method of claim 1, wherein the electrolyte media comprises:
  a) a carbonate; and
  b) a magnetic additive component.

19. The method of claim 18, wherein the carbonate comprises a carbide-growth component.

20. The method of claim 18, wherein the magnetic additive component comprises at least one of a magnetic material additive component, a carbide-growth component and any combination thereof.

21. The method of claim 18, wherein the carbonate is an alkali carbonate, an alkali earth carbonate and any combination thereof.

22. The method of claim 18, wherein the carbonate comprises an oxide, a borate, a sulfate, a nitrate, a chloride, a chlorate, a phosphate and any combination thereof.

23. The method of claim 18, wherein the magnetic additive component is an iron-based additive.

24. The method of claim 23, wherein the iron-based additive is one or more of cast iron powder, iron metal, steel, stainless steel, an iron containing metal alloy, an iron oxide, $FeO$, $Fe_2O_3$, $Fe_3O_4$, an iron containing salt and any combination thereof.

25. The method of claim 18, wherein the magnetic additive component is present in an amount of about 0.001 molal to about 10 molal or higher.

* * * * *